J. A. HANNA.
Jump-Seats for Carriages.

No. 150,569. Patented May 5, 1874.

Witnesses:
G. Mathys.
John C. Kernon

Inventor:
Jno. A. Hanna
Per
Attorneys.

UNITED STATES PATENT OFFICE.

JOHN A. HANNA, OF BEL AIR, MARYLAND.

IMPROVEMENT IN JUMP-SEATS FOR CARRIAGES.

Specification forming part of Letters Patent No. 150,569, dated May 5, 1874; application filed February 10, 1874.

*To all whom it may concern:*

Be it known that I, JOHN A. HANNA, of Bel Air, in the county of Harford and State of Maryland, have invented a new and Improved Jump-Seat for Carriages; and I do hereby declare that the following is a full, clear, and exact description of the same, reference being had to the accompanying drawing forming a part of this specification, in which—

Figure 1:
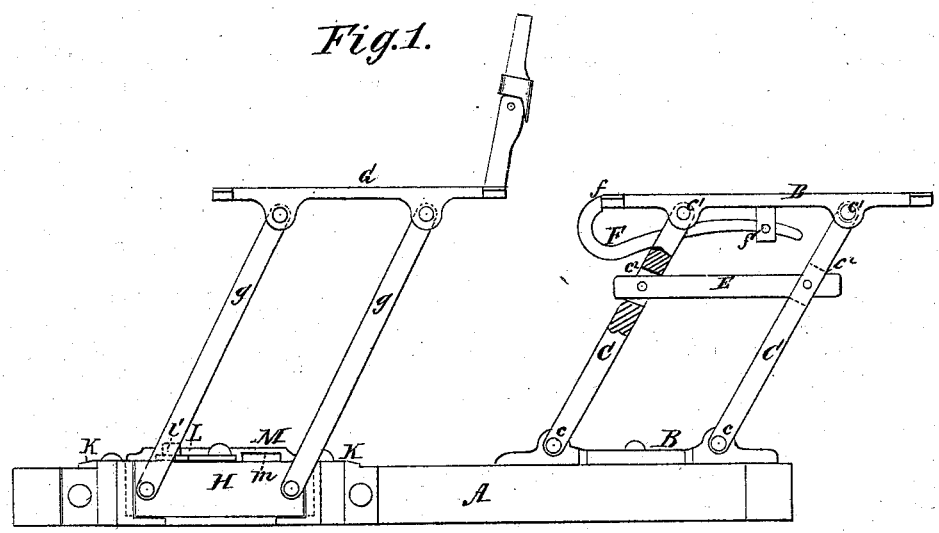
Figure 2:
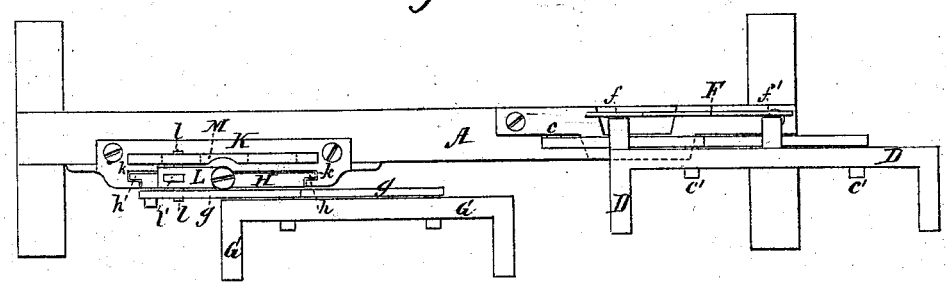

Figure 1 is a sectional elevation, and Fig. 2 a plan view illustrative of my invention.

The invention relates to and consists in novel means for making the jump-seats of carriages more convenient and desirable, as hereinafter fully described, and then pointed out in the claims.

A represents one of the two longitudinal side pieces of the body of a carriage, provided with a superposed plate, B, in which is pivoted the lateral stud $c$ of the uprights C C. The latter have also, at the upper end, another side stud, $c^1$, which is pivoted in the rear seat-support D. In the two uprights C C are mortises $c^2 c^2$, in which is pivoted the connecting-bar E, that comes diagonally across each mortise, stops each upright, and divides the strain equally. F is a side handle, which is connected with the seat-support D by means of an end piece, $f$, and a central piece, $f'$, and serves the purpose of enabling the rear seat to be handily turned back or forward, and so that the same support may be used on either side of seat. One advantage of this arrangement of parts is that the seat-support sets well in toward the center of carriage-body and allows the bolts to go up through seat without running into the end panels. G is a front-seat support, arranged on the uprights $g g$, pivoted thereto and to the plate H. The latter is provided with end tongues $h h$, which fit into grooves $k$ of a plate, K, that is attached to the piece A. On the top of plate H is the pivoted double latch L, having two opposite horizontal projections or catches, $l l$, and one vertical flange or thumb-piece, $l'$, while on the plate K is the loop-piece M, having the recesses $m m$, in one of which always is fastened one of the catches $l l$. The latter, however, not only serve to fasten the plates H K securely together, but to furnish a support to the seat-frame G $g g$ in whatever direction it may be placed.

When it is desired to dispense with one seat in the carriage the front one is removed and the rear one thrown forward on its pivots, so as to bring the driver more conveniently forward.

On the other hand, when it becomes necessary (for the accommodation of more persons) to introduce a second seat, the rear one is thrown back and the front one inserted. After being locked, the latter is made to rest against and is supported by one of the projections $l$.

Having thus described my invention, what I claim as new, and desire to secure by Letters Patent, is—

1. The combination, with pivoted and mortised uprights C C, of the connecting-bar E, passing through and pivoted in said mortises, as and for the purpose specified.

2. A jump-seat support provided with the side handle F, as and for the purpose set forth.

3. The combination of two front-seat frames, G $g$, tongued plates H, and grooved plates K, to enable the front seat to be readily attached and detached in the manner described.

4. The pivoted piece L, provided with two horizontal projections, $l l$, as and for the purpose specified.

JOHN A. HANNA.

Witnesses:
  B. H. HANSON,
  JAS. A. FULTON.